US006945607B2

United States Patent
Kojima

(10) Patent No.: US 6,945,607 B2
(45) Date of Patent: Sep. 20, 2005

(54) WALK IN APPARATUS FOR VEHICLE SEAT

(75) Inventor: Yasuhiro Kojima, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 57 days.

(21) Appl. No.: 10/673,252

(22) Filed: Sep. 30, 2003

(65) Prior Publication Data

US 2004/0113473 A1 Jun. 17, 2004

(30) Foreign Application Priority Data

Sep. 30, 2002 (JP) ..................... 2002-285352

(51) Int. Cl.[7] .............................. B60N 1/04
(52) U.S. Cl. ..................... 297/341; 248/430
(58) Field of Search ............ 297/341; 248/429, 248/430

(56) References Cited

U.S. PATENT DOCUMENTS

| 4,742,983 | A | * | 5/1988 | Nihei | 248/429 |
|---|---|---|---|---|---|
| 5,352,019 | A | * | 10/1994 | Bauer et al. | 297/341 |
| 5,882,074 | A | * | 3/1999 | Kojima | 297/341 |
| 5,944,383 | A | * | 8/1999 | Mathey et al. | 297/341 |
| 6,048,030 | A | * | 4/2000 | Kanda et al. | 297/341 |
| 6,098,946 | A | * | 8/2000 | Sechet et al. | 248/430 |
| 6,102,478 | A | * | 8/2000 | Christopher | 297/341 |
| 6,341,819 | B1 | | 1/2002 | Kojima et al. | |
| 6,616,233 | B1 | * | 9/2003 | Debus et al. | 297/341 |
| 6,619,741 | B1 | * | 9/2003 | Tame | 297/341 |
| 2003/0122412 | A1 | * | 7/2003 | Niimi et al. | 297/341 |

FOREIGN PATENT DOCUMENTS

EP          0 878 344 A     11/1998

* cited by examiner

Primary Examiner—Peter R. Brown
(74) Attorney, Agent, or Firm—Burns, Doane, Swecker & Mathis LLP

(57) ABSTRACT

A walk-in apparatus of a vehicle seat slide includes an upper rail and a lower rail, a lock plate for locking the upper rail position on the lower rail, a release lever engaging with the lock plate for releasing the locking, a supporting lever engaging the release lever, a reclining plate rotating when the seat back rotates more than a predetermined forward angle, a memory plate on the lower rail within a predetermined range, a first supporting portion on the supporting lever for holding the release lever at a first position where the lock plate unlocks when the supporting lever is out of the memory plate range and a second supporting portion provided on the supporting lever for holding the release lever at a second position and waiting for the upper rail to be locked when the reclining plate disengages with the seat back.

4 Claims, 5 Drawing Sheets

WALK IN APPARATUS FOR VEHICLE SEAT

This application is based on and claims priority under 35 U.S.C. § 119 with respect to Japanese Application No. 2002-285352 filed on Sep. 30, 2002, the entire content of which is incorporated herein by reference.

FIELD OF THE INVENTION

This invention generally relates to a walk-in apparatus for a vehicle seat. More particularly, the present invention pertains to the walk-in apparatus for the vehicle seat, which provides a forward slide movement of the vehicle seat relative to a vehicle floor in conjunction with a forward reclining movement of a seat back of the vehicle seat relative to a seat cushion.

BACKGROUND OF THE INVENTION

A known walk-in apparatus is disclosed, for example, in the U.S. Pat. No. 6,341,819 as a seat slide device for a vehicle. The walk-in apparatus has been known comprising a slide rail mechanism which slidably supports the vehicle seat in longitudinal direction relative to the vehicle floor, a lock plate which locks the slide rail mechanism and restrict the slide movement of the slide rail mechanism, a release lever which engages with the lock plate and releases the lock plate from the slide rail mechanism, and a supporting lever which engages with the release lever to keep the engaging condition between the lock plate and the release lever under a predetermined condition. A reclining plate, which rotates in conjunction with a pivotal movement of the seat back when the seat back is tilted more than or equal to a predetermined angle in forward direction of the vehicle by an actuation of a reclining arm mechanism which rotatably and adjustably supports the seat back of the vehicle seat, is connected to the release lever with the a rod.

However, the reclining plate and the rod are connected with a certain allowance in longitudinal direction of the rod, which allows the reclining plate to independently rotate in one direction. Position of the release lever relative to the slide rail mechanism is controlled through the rod by the reclining plate which is contacting with and supported by a certain portion of the reclining arm mechanism. On this account, the position of the release lever relative to the lock plate is easily affected by difference of the position and the size of the reclining plate, the rod and so on. As a result, the walk-in apparatus loses its stability. Thus, the walk-in apparatus needs to be comprised in consideration of reducing the difference of the position of the release lever relative to the lock plate and the supporting lever.

SUMMARY OF THE INVENTION

The invention involves a walk-in apparatus of a vehicle seat which comprises a slide rail mechanism including an upper rail which is assembled to a vehicle seat side and a lower rail which is engaged slidably with the upper rail and assembled to a vehicle floor side, the slide rail mechanism supporting the vehicle seat for allowing a position of the vehicle seat to be adjusted relative to the vehicle floor in vehicle longitudinal direction, a lock plate assembled to the upper rail for locking the slide movement of the upper rail on the lower rail, a release lever which is assembled to the upper rail for releasing the locking of the slide movement of the upper rail on the lower rail by the lock plate and adapted to engage with the lock plate, a supporting lever which is assembled to the upper rail and adapted to engage with the release lever, a reclining plate which rotates in conjunction with a seat back when the seat back is rotated equal to or more than a predetermined angle in forward direction by an actuation of a reclining arm mechanism supporting the seat back of the vehicle seat, a rod connecting the release lever and the reclining plate, a memory plate which is assembled to the lower rail within a predetermined range in vehicle longitudinal direction, a first supporting portion provided on the supporting lever which is engaged with the release lever for holding the release lever on a first position of the release lever where the lock plate unlock the slide movement of the upper rail on the lower rail in conjunction with the release lever when the supporting lever is not within the range of the memory plate characterized in that the walk-in apparatus of the vehicle further includes a second supporting portion provided on the supporting lever or the upper rail for holding the release lever at a predetermined second position and waiting the slide movement of the upper rail on the lower rail to be locked by the lock plate when the reclining plate disengage with the seat back, and the first supporting portion of the supporting lever becomes disengaged from the release lever.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Referring now to an embodiment of the walk-in apparatus for the vehicle of the present invention with reference to the attached drawings, FIG. 1 through FIG. 6.

Figure 1:
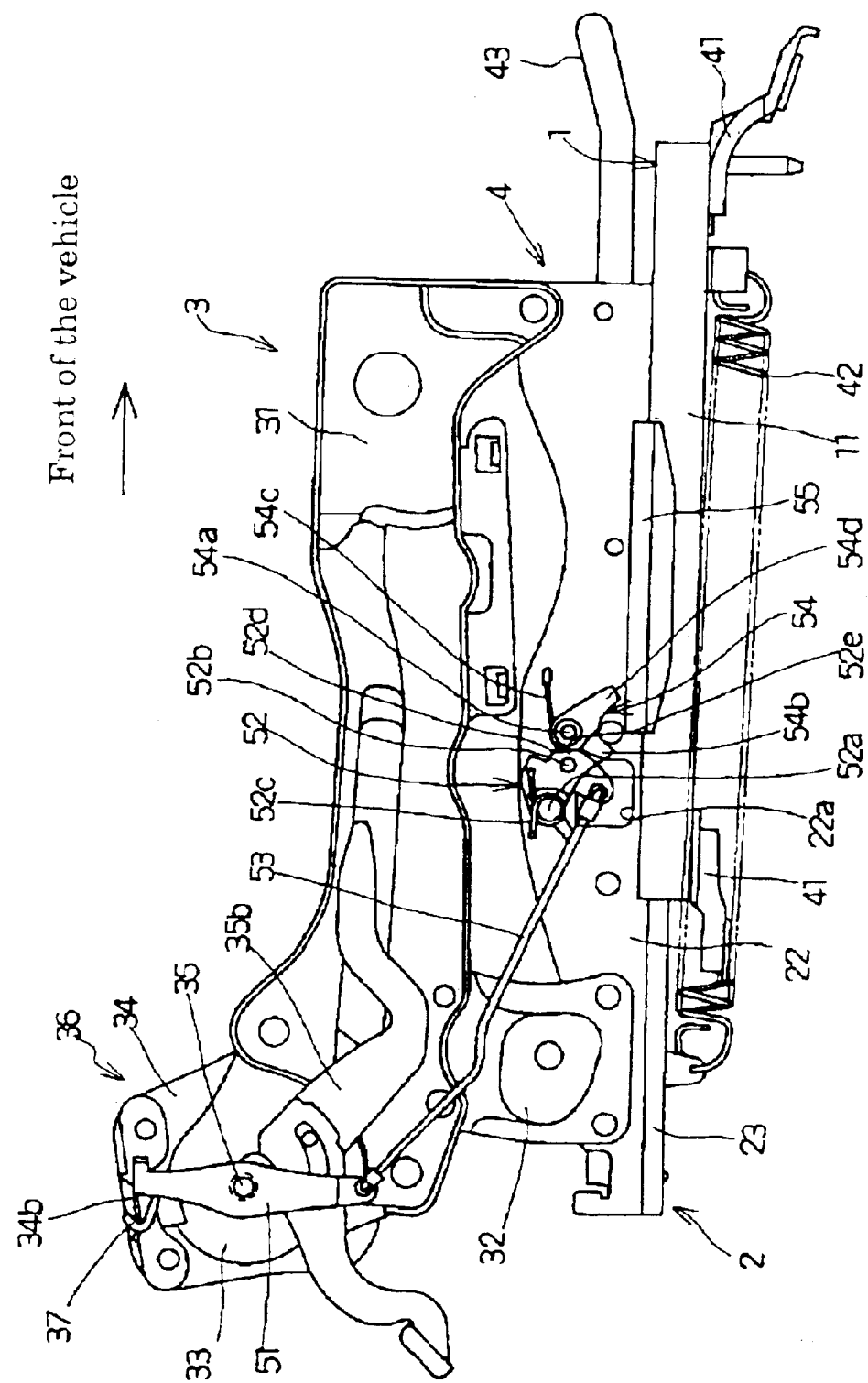
FIG. 1 illustrates a side view of the vehicle seat including the walk-in apparatus in accordance with the present invention.
Figure 3:
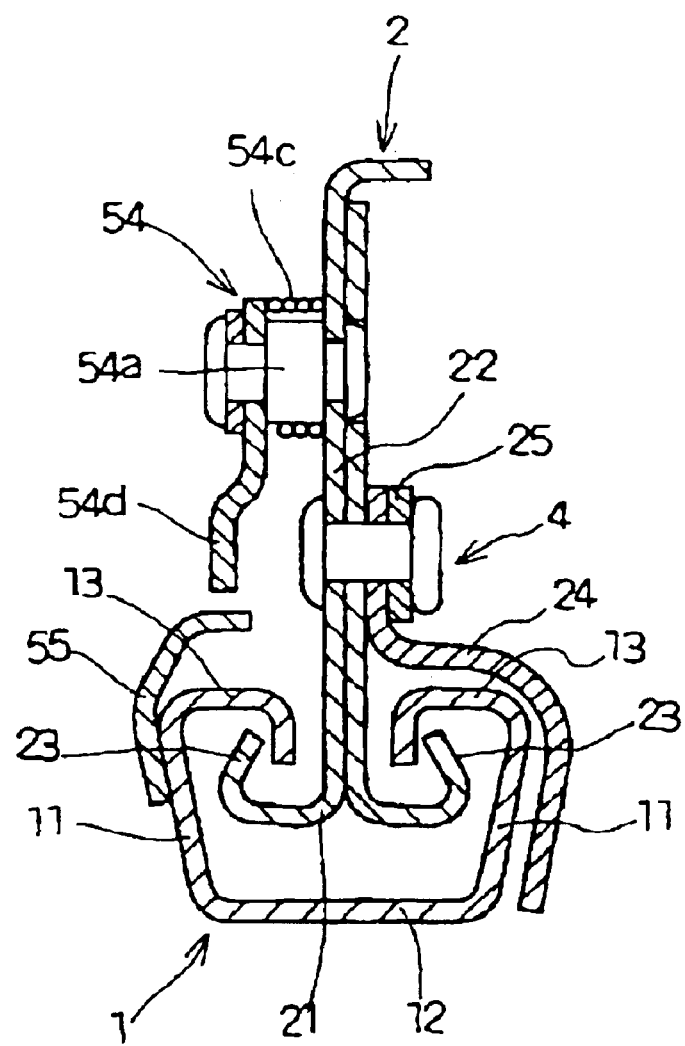
FIG. 3 illustrates a cross-sectional view of the supporting lever of the walk-in apparatus for the vehicle seat in FIG. 1 in accordance with the present invention.
Figure 4:
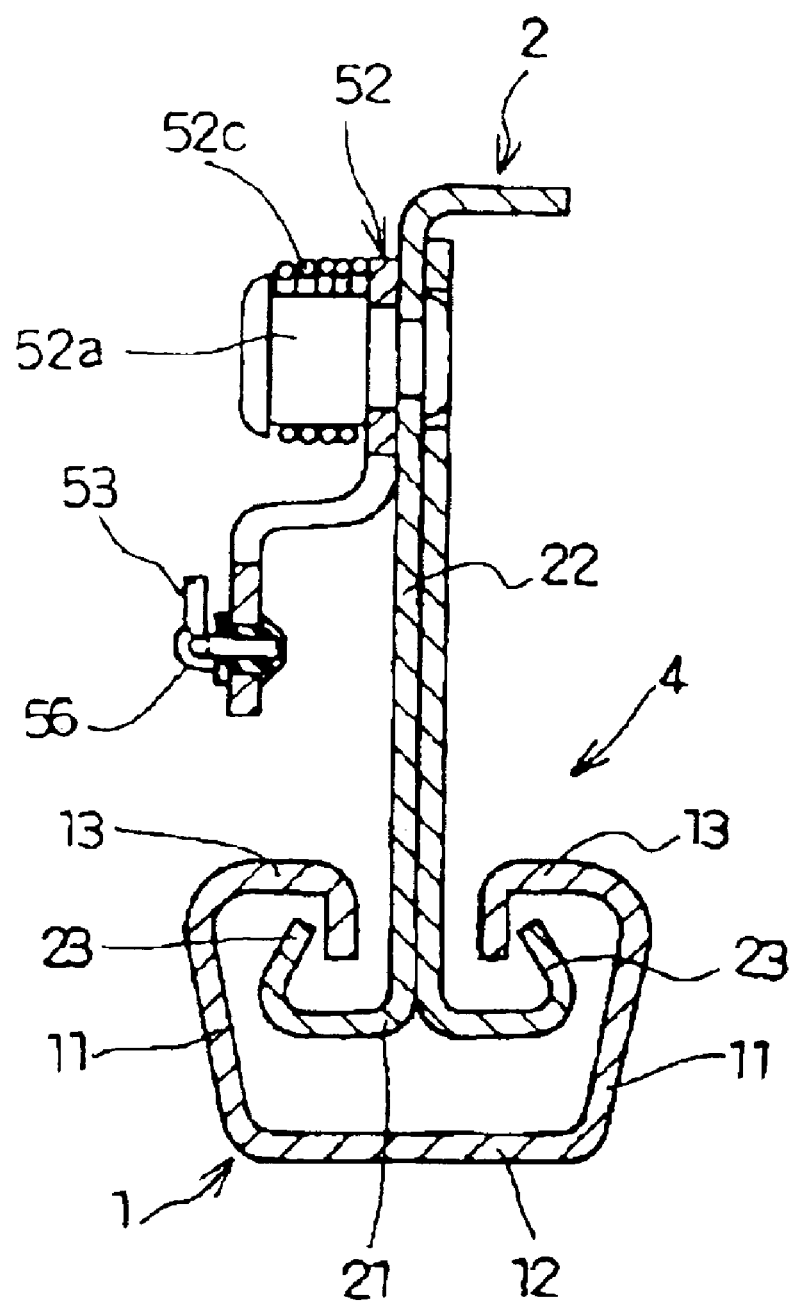
FIG. 4 illustrates a cross-sectional view of the release lever of the walk-in apparatus for the vehicle seat in FIG. 1 in accordance with the present invention.
Figure 5:
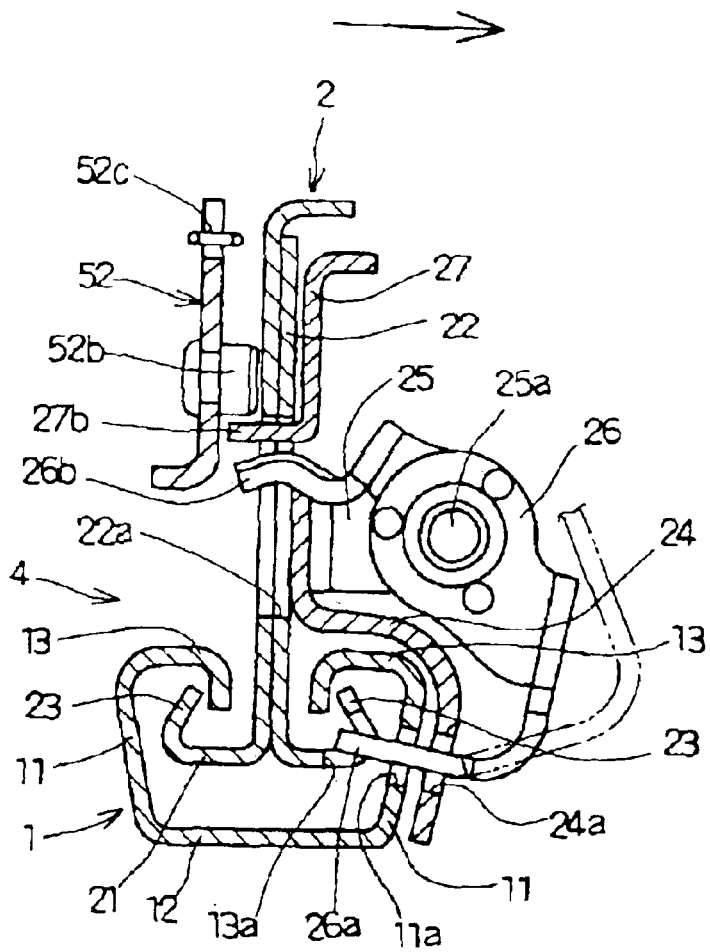
FIG. 5 illustrates a cross-sectional view of the lock plate of the walk-in apparatus for the vehicle seat in FIG. 1 in accordance with the present invention.

As shown in FIG. 1, a slide rail mechanism 4 in accordance with the invention is attached to the both right and left of the vehicle seat and bears a pair of lower rails 1. The lower rails 1 are arranged parallel to each other and secured to the vehicle floor (not shown) by a bracket 41. The lower rail 1 is elongated in vehicle longitudinal direction and includes side walls 11 and a base portion 12. The base portion 12 is provided between both side walls 11 for connecting each other, so that the lower rail 1 has an approximately U-shaped form from its cross sectional view as shown in FIG. 3 through FIG. 5. Engaging flange walls 13 are formed on the lower rail 1, which continuously extend from the top edges of the both side walls 11 and bend inwardly facing each other with a predetermined clearance.

Upper rail 2 is fixed to a frame 31 which forms a part of the seat cushion of the vehicle seat by a bracket 32 and elongated in vehicle longitudinal direction. The upper rail 2 include horizontal walls 21 and vertical walls 22 and have an approximately contra T-shaped form from its cross sectional view. The engaging flange walls 23 are formed on the upper rail 2, which continuously extend from the both edges of the horizontal walls 21 of the upper rail 2 and bend in the upward direction. The engaging flange walls 23 of the upper rail 2 engage with the engaging flange walls 13 of the lower rail 1 through a ball (not shown). Thus, the upper rail 2 is slidably supported by the lower rail 1 in vehicle longitudinal direction. When the lower rail 1 slidably supports the upper rail 2, the horizontal walls 21 of the upper rail 2 are arranged between the side walls 11 parallel to the base portion 12 by way of roller (not shown), and the vertical walls 22 extend upward between the engaging walls 13. A spring 42 is provided between a front edge of the lower rail 1 (rightward in FIG. 1) and a rear edge of the upper rail 2 (leftward in FIG. 1), and the upper rail 2 is constantly forced by biasing force of the spring 42 for sliding in front direction of the vehicle on the lower rail 1.

On inner side-wall 11 of the lower rail 1 with respect to the seat width direction (right direction in FIG. 5), a series of engaging holes 11a is formed. The engaging holes 11a are formed with a predetermined interval in longitudinal direction of the lower rail 1. A penetration hole 13a which are adapted to accord with the engaging hole 11a, is formed on inner engaging flange wall 23 of the upper rail 2 with respect to the seat width direction. An auxiliary plate 24, which forms a through hole 24a being able to accord with the engaging hole 11a, is fixed to the inner vertical wall 22 with respect to the seat width direction.

A bracket 25 is fixed on the upper rail 2 together with the auxiliary plate 24. A lock plate 26 is pivotally held on the bracket 25 by pin 25a. The lock plate 26 possesses engaging teeth 26a which penetrate through the through hole 24a and the penetration hole 13a and is adapted to engage or disengage with the engaging hole 11a. The lock plate 26 is biased consistently by a spring (not shown) provided around the pin 25a in clockwise direction in FIG. 5 to allow the engaging teeth 26a to be engaged with the engaging hole 11a. An engagement flange 26b is formed on the lock plate 26, which faces to the engaging teeth 26a across the pin 25a.

As shown in FIG. 5, an operating lever 27 is provided on inner vertical wall 22 of upper rail 2 with respect to the seat width direction and pivotally held at the central portion in longitudinal direction of the operating lever 27. An engaging flange 27b is formed at the rear edge of the operating lever 27 with respect to longitudinal direction of the operating lever 27, and an operation handle 43 (FIG. 1) is fixedly held at the front edge of the operating lever 27 with respect to longitudinal direction. The operation handle 43 connects both right and left operating levers 27 and forms so-called a loop handle, which is provided under the front portion of the seat cushion for operating the both right and left operating levers 27 integrally. The engaging flange 27b is provided facing to the lock plate 26 and adapted to engage with the lock plate 26 at its lower portion. The operating lever 27 is consistently and rotatably biased by a spring (not shown) to space the engaging flange 27b from the lock plate 26 (upper direction in FIG. 5).

According to such configuration, the engaging teeth 26a of the lock plate 26 engages with the engaging hole 11a on the lower rail 1, as a result, the slide operation of the upper rail 2 relative to the lower rail 1 is limited. In this way, the vehicle seat keeps its position at a predetermined position relative to the vehicle floor.

In addition, the operating lever 27 rotates against the biasing force by the spring, and the engaging flange 26b contacts the engaging flange 27b, which causes the rotation of the lock plate 26. Then, the engaging teeth 26a disengage from the engaging hole 11a, and the upper rail 2 becomes freely slidable relative to the lower rail 1. Thus, the vehicle seat can be slidable on the vehicle floor in vehicle longitudinal (back and forth). In this way, the position of the vehicle seat relative to the vehicle floor in vehicle longitudinal direction can be adjusted.

As shown in FIG. 1, an upper arm 34 is fixed to the lower side surfaces of a frame (not shown) which forms a part of the seat back of the vehicle seat, and is freely rotatably held by a lower arm 33. A pivot shaft 35 penetrates through and is supported by the upper arm 34 and the lower arm 33. Known a ratchet and a pawl (not shown) are provided between the lower arm 33 and the upper arm 34, which are engaged or disengaged by an operation of an operation handle 35b which is integrally assembled to the pivot shaft 35.

A reclining arm mechanism 36 comprises the lower arm 33, the upper arm 34 and the pivot shaft 35, which reclines the seat back of the vehicle seat relative to the seat cushion in vehicle longitudinal direction (back and forth). A spring 37 is provided between the lower arm 33 and the upper arm 34, and the lower arm 33 is constantly and pivotally biased by the spring 37 in front direction of the vehicle.

In such reclining arm mechanism 36, a pivotal movement of the upper arm 34 relative to the lower arm 33 is limited by the meshing engagement between the pawl and the ratchet, and the seat back is held at a predetermined angle relative to the seat cushion. When the pawl disengages from ratchet by an operation of the operation handle 35b, the upper arm 34 is released for pivoting relative to the lower arm 33, as a result, the seat back reclines in vehicle longitudinal direction relative to the seat cushion. In other words, the angle of the seat back relative to the seat cushion can be freely adjustable. The operation handle 35b can be operated by hand from front and be operated by foot from rear because of its form extending toward both front and rear.

Figure 2:
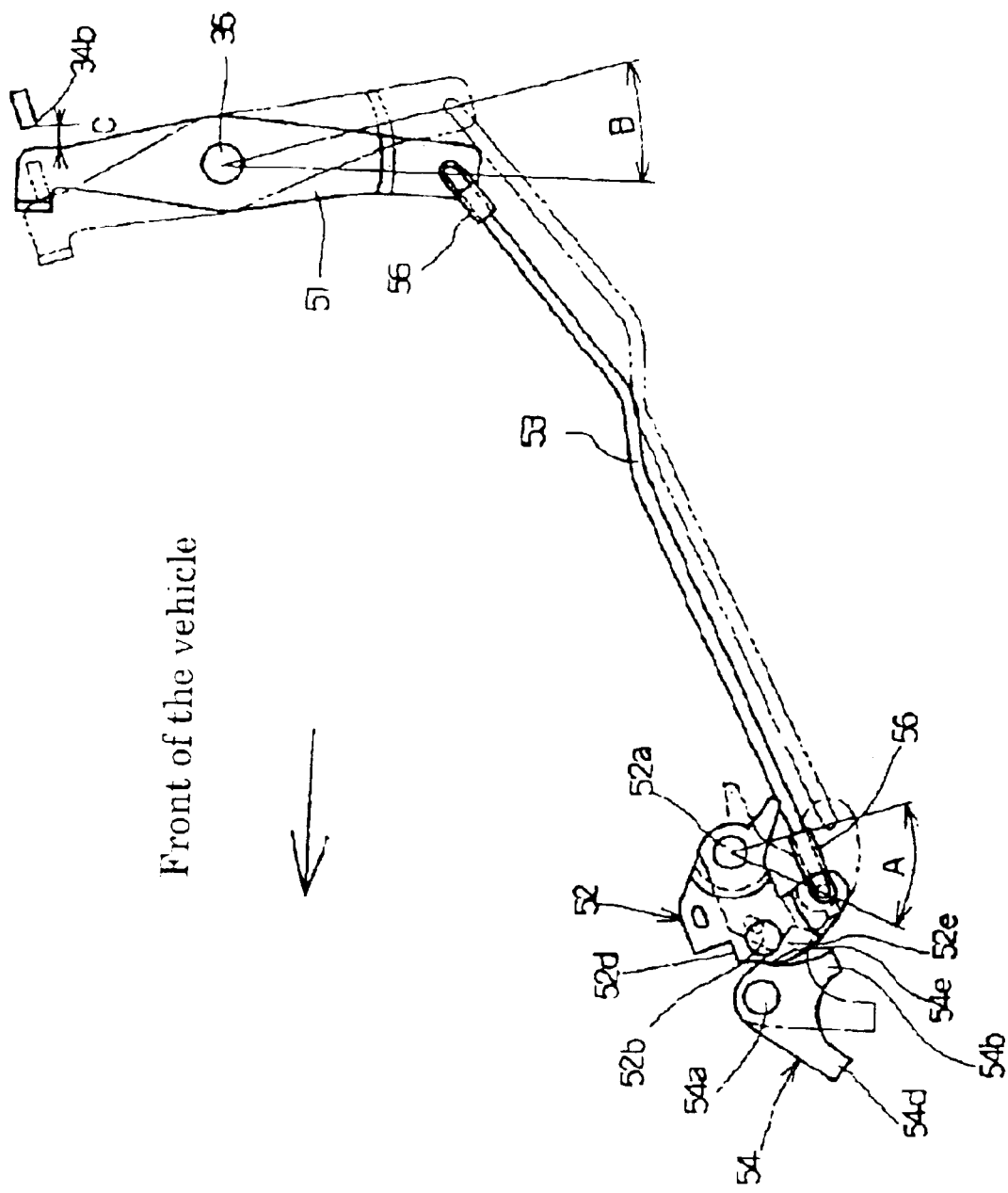
FIG. 2 illustrates a front view of the actuation of the walk-in apparatus for the vehicle seat in accordance with the present invention.

As shown in FIG. 2, reclining plates 51 are held to each edges of the pivot shaft 35 of the reclining arm mechanism 36 allowing its relative pivotal movement. A reclining plate 51 is assembled keeping a predetermined clearance C between its the upper portion and bracket 34b which is fixed to the upper arm 34 when the upper arm 34 is in the most front seating position. As described later, the clearance C is defined by a position of the release lever 52 through the rod 53.

Figure 6:
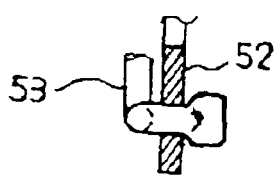
FIG. 6 illustrates a second embodiment of a connection means of the rod of the walk-in apparatus for the vehicle seat in accordance with the present invention.

The release lever 52 is held by pin 52a allowing pivotal movement on the outer surfaces of the vertical wall 22 of the upper rail 2 with respect to the seat width direction. The release lever 52 extends and forms arm portion. One end of the rod 53 is rotatably connected to the edge of arm portion by snap 56, which restricts the rod 53 to move in rod longitudinal direction. The other end of the rod 53 is connected to the reclining plate 51 by snap 56. As shown in FIG. 6, the rod 53 may be connected by means of pressing the edge of the rod 53 for preventing the rod from slipping out instead of using the snap 56, which also allows pivotally movement and restricts the movement in rod longitudinal direction.

As shown in FIG. 5, an engaging pin 52b which projects toward the vertical wall 22 of the upper rail 2 is fixed to the release lever 52. The engaging flange 27b of the operating lever 27 penetrates through the opening 22a which is formed on the vertical walls 22 of the upper rail 2 and extends toward the engaging pin 52b for being able to engage with the engaging pin 52b on its upper surface of the engaging flange 27b. As shown in FIG. 4, the release lever 52 is biased consistently by biased force of a spring 52c provided around the pin 25a to space the engaging pin 52b from the engaging flange 27b (in clockwise direction in FIG. 2).

As shown in FIGS. 1, 2, and 3, a supporting lever 54 is pivotally held by a pin 54a on the outer surfaces of the vertical wall 22 of the upper rail 2. The supporting lever 54 has edge surfaces at the same high level of edge surfaces of the release lever 52. An engaging shoulder 52d and a contacting projecting portion 52e are formed on the peripheral surfaces of the release lever 52, which are facing to the supporting lever 54. On the other hand, an arm portion 54b (first supporting portion) which is adapted to engage with the engaging shoulder 52d is formed on the peripheral surfaces of the supporting lever 54.

As shown in FIG. 3, a spring 54c is provided around the pin 54a, which is constantly pivotally applying biasing force to the supporting lever 54 in anticlockwise direction in FIG. 2. A contacting depressed portion 54e (second supporting portion) is formed on the supporting lever 54, which is adapted to engage with the contacting projecting portion 52e of the release lever 52. When the upper portion of the reclining plate 51 disengages with the bracket 34b as shown in solid line in FIG. 2, in other words, the reclining plate 51 is not in conjunction with the pivotally movement of the seat back, the contacting depressed portion 54e is adapted to stop further pivotally movement of the release lever 52 in clockwise direction for holding the release lever 52 at a predetermined standby position (second position) and stop further pivotally movement of the supporting lever 54 in anticlockwise direction.

Thus, the position of the release lever 52 and the supporting lever 54 relative to the upper rail 2, when the contacting projecting portion 52e and the contacting depressed portion 54e (second supporting portion) are engaged, is accurately determined. Particularly, the position of the release lever 52 relative to the upper rail 2 is correctly determined, and the physical relationship between the engaging pin 52b of the release lever 52 and the engaging flange 27b of the operating lever 27 is less affected by the differences of the each portion's sizes and correctly determined. In this way, the lock-unlock mechanism of the slide rail mechanism 4 becomes stable.

The second supporting portion which correctly secures the position of the release lever 52 relative to the upper rail 2 may be formed directly by means of engaging the release lever 52 with a stopper (not shown) which is provided on the upper rail 2 as well as by means of engaging the release lever 52 with the certain portion of the supporting lever 54 as mentioned above.

Memory plate 55 is fixed on the outer surfaces of the engaging flange 13 and the side wall 11, which is provided on the outer lower rail 1 with respect to the seat width direction. A leg portion 54d is formed on the supporting lever 54 for engaging with the memory plate 55.

The operation of the walk-in apparatus will be explained.

As shown in FIG. 2, when the seat back is reclined forward more than or equal to the predetermined angle relative to the seat cushion (folding forward), the predetermined clearance C is reduced, then the bracket 34b of the upper arm 34 contacts the reclining plate 51. The reclining plate 51 pivots at angle B in anticlockwise direction in FIG. 2 and becomes in a position which is indicated in a chain double-dashed line. The pivotal movement of the reclining plate 51 leads the rod 53 toward rear of the vehicle, and the release lever 52 pivots at angle A in anticlockwise direction in FIG. 2 opposite to biasing force of the spring 52c.

The engaging pin 52b of the release lever 52 moves toward the engaging flange 27b from its position in FIG. 5 and engages with the upper surface of the engaging flange 27b of the operating lever 27 and pushes down the engaging flange 27b. Then, the operating lever 27 is rotated, and the under surface of the engaging flange 27b engages with the engaging flange 26b of the lock plate 26. Thus, the engaging flange is pushed down. The lock plate 26 is rotated in anticlockwise direction on FIG. 5 opposite to biasing force by the spring 25b. The engaging teeth 26a of the lock plate 26 disengages from the engaging hole 11a of the lower rail 1, and the upper rail 2 slides relative to the lower rail 1 by biasing force of the spring 42. In this way, the vehicle seat slides in front direction of the vehicle relative to the vehicle floor.

According to this apparatus, the angle B is set less than the angle A. Even if the length of the rod 53 or the distance between the pin 52a which works as a pivot shaft of the release lever 52 and the pivot shaft 35 of the reclining plate 51 is different, the angle A is secured at adequate large angle with small clearance C. This constitution ensures that the engaging teeth 26a of the lock plate 26 disengages from the engaging hole 11a of the lower rail 1.

When the vehicle seat slides and the leg portion 54d of the supporting lever 54 moves ahead over the range of the memory plate 55, the contacting projecting portion 52e of the release lever 52 disengages from the contacting depressed portion 54e of the supporting lever 54 by the rotation of the release lever 52 in anticlockwise direction in FIG. 2, as a result, the supporting lever 54 rotates in anticlockwise direction in FIG. 2 by biasing force of the spring 54c, and the arm portion 54b (first supporting member) engages with the engaging shoulder 52d of the release lever 52. The rotation of the release lever 52 in clockwise direction by biasing force of the spring 52c is limited, and the release lever 52 is held in a predetermined position (first position). Thus, the disengaging condition between the engaging teeth 26a of the lock plate 26 and the engaging hole 11a of the lower rail 1 is maintained. In this condition, the leg portion 54d of the supporting lever 54 is set on the track of the slide movement of the memory plate 55.

The bracket 34a of the upper arm 34 and the reclining plate 51 becomes disengaged, when the forwardly reclined seat back is restored to its original condition as mentioned above, in other word, the seat back is reclined in rear direction of the vehicle relative to the seat cushion, then the vehicle seat slides in rear direction of the vehicle relative to the vehicle floor (The seat may recline and slide at the same time). The leg portion 54d of the supporting lever 54 engages with the memory plate 85, so that the supporting lever 54 is rotated in clockwise direction in FIG. 2 against biased force of the spring 54c.

Then, the arm portion 54b and the engaging shoulder 52d of the release lever 52 becomes engaged, and the release lever 52 is rotated in clockwise direction in FIG. 2 by biasing force of the spring 52c and restored to the condition which is shown in the solid line of FIG. 2. As a result, the engaging pin 52b of the release lever 52 and the engaging flange 27b of the operating lever 27 become disengaged, and the under surface of the engaging flange 27b and the engaging flange 26b of the lock plate 26 are disengaged, then the lock plate 26 is rotated in clockwise direction in FIG. 5 by the biasing force of the spring (not shown). Thus, the engaging teeth 26a of the lock plate 26 engage with the engaging hole 11a of the lower rail 1, and the slide movement of the upper rail 2 on the lower rail is limited. In this way, the vehicle seat is held in the predetermined position relative to the vehicle floor. At this time, the predetermined position of the vehicle seat relative to the vehicle floor can be adjusted to another particular position by setting position of the memory plate 55.

In the usual position of the seat, the rotation of the supporting lever 54 by biasing force of the spring 54c is restricted by the engagement between the contacting depressed portion 54e of the arm portion 54b and the contacting projecting portion 52e of the release lever 52 as shown in the solid line in FIG. 2. The arm portion 54b is thus kept on the outside position of the movement path of the memory plate 55.

Thus, the unexpected interference between the arm portion 54b and the memory plate 55 caused by the slide movement of the upper rail 2 on the lower rail 1 operated by the operate handle 42 is prevented, and the upper rail 2 can slide on the lower rail 1 without any unexpected interference. In addition, the chattering noise from the contact between the arm portion 54b and the memory plate 55 is prevented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A walk-in apparatus of a vehicle seat comprising:
    a slide rail mechanism including an upper rail which is assembled to a vehicle seat side and a lower rail which is engaged slidably with the upper rail and assembled to a vehicle floor side, the slide rail mechanism supporting the vehicle seat for allowing a position of the vehicle seat to be adjusted relative to the vehicle floor in a longitudinal direction of the vehicle;
    a lock plate assembled to the upper rail for locking the slide movement of the upper rail on the lower rail;
    a release lever which is assembled to the upper rail for releasing the locking of the slide movement of the upper rail on the lower rail by the lock plate and adapted to engage with the lock plate;
    a supporting lever which is assembled to the upper rail and adapted to engage with the release lever;
    a reclining plate which rotates in conjunction with the seat back when the seat back is rotated equal to or more than a predetermined angle in forward direction by an actuation of a reclining arm mechanism supporting the seat back of the vehicle seat;
    a rod connecting the release lever and the reclining plate;
    a memory plate which is assembled to the lower rail within a predetermined range in the longitudinal direction of the vehicle;
    a first supporting portion provided on the supporting lever which is engaged with the release lever for holding the release lever on a first position of the release lever where the lock plate unlocks the slide movement of the upper rail on the lower rail in conjunction with the release lever when the supporting lever is not within the range of the memory plate; and
    a second supporting portion provided on the supporting lever or the upper rail for holding the release lever at a predetermined second position and waiting for the slide movement of the upper rail on the lower rail to be locked by the lock plate when the reclining plate disengages with the seat back, and the first supporting portion of the supporting lever becomes disengaged from the release lever.

2. A walk-in apparatus for the vehicle seat according to claim 1, wherein the rod is connected to both the reclining plate and the release lever and rotatable for restricting the movement in a longitudinal direction of the rod.

3. A walk-in apparatus for the vehicle seat according to claim 2, wherein the release lever is connected to the reclining plate through the rod, and a pivot angle of the reclining plate is set to be smaller than a pivot angle of the release lever.

4. A walk-in apparatus for the vehicle seat according to claim 1, wherein the release lever is connected to the reclining plate through the rod, and a pivot angle of the reclining plate is set to be smaller than a pivot angle of the release lever.

* * * * *